US012682115B2

(12) United States Patent
Lv

(10) Patent No.: US 12,682,115 B2
(45) Date of Patent: Jul. 14, 2026

(54) SENSITIVE INFORMATION PROTECTION DURING SCREEN SHARING ON REMOTE DESKTOPS

(71) Applicant: Omnissa, LLC, Mountain View, CA (US)

(72) Inventor: Lin Lv, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 121 days.

(21) Appl. No.: 18/656,207

(22) Filed: May 6, 2024

(65) Prior Publication Data

US 2025/0342278 A1     Nov. 6, 2025

(51) Int. Cl.
| | |
|---|---|
| *H04L 12/58* | (2006.01) |
| *G06F 3/14* | (2006.01) |
| *G06F 9/451* | (2018.01) |
| *G06F 9/455* | (2018.01) |
| *G06F 15/16* | (2006.01) |
| *G06F 21/62* | (2013.01) |
| *H04L 15/16* | (2006.01) |

(52) U.S. Cl.
CPC .......... *G06F 21/6263* (2013.01); *G06F 9/452* (2018.02); *G06F 9/45558* (2013.01); *G06F 2009/45587* (2013.01); *G06F 2009/45591* (2013.01)

(58) Field of Classification Search
CPC .. G06F 21/6263; G06F 9/452; G06F 9/45558; G06F 2009/45587; G06F 2009/45591
USPC .......................................................... 726/28
See application file for complete search history.

(56) References Cited

U.S. PATENT DOCUMENTS

| | | | |
|---|---|---|---|
| 8,970,450 B2 * | 3/2015 | Momchilov .......... | G06F 3/0481 709/219 |
| 11,722,550 B2 | 8/2023 | Lv et al. | |
| 2012/0226742 A1 * | 9/2012 | Momchilov .......... | G06F 3/0481 709/203 |
| 2012/0324365 A1 * | 12/2012 | Momchilov ............ | H04L 67/10 715/738 |
| 2013/0031618 A1 * | 1/2013 | Momchilov ............ | H04L 67/08 726/7 |
| 2014/0304326 A1 * | 10/2014 | Wesley ............... | H04L 67/1095 709/203 |

(Continued)

*Primary Examiner* — Berhanu Shitayewoldetadik
(74) *Attorney, Agent, or Firm* — Kim & Stewart LLP

(57)     ABSTRACT

Example methods and systems for sensitive information protection during screen sharing on a remote desktop are described. In one example, a computer system may establish a connection between a remote desktop and a client device to allow access to multiple applications supported by the remote desktop. The computer system may obtain configuration information identifying sensitive information that includes at least a particular application from the multiple applications or an information item. Based on the configuration information, the computer system may monitor the particular application or the information item. In response to detecting that (a) screen sharing is enabled for a first user to share a visual representation associated with the remote desktop with a second user and (b) the particular application or the information item being monitored is active, the computer system may perform a remediation action to protect against potential disclosure of the sensitive information.

17 Claims, 9 Drawing Sheets

(56) References Cited

U.S. PATENT DOCUMENTS

| | | | | |
|---|---|---|---|---|
| 2015/0030066 | A1* | 1/2015 | Xu | H04N 19/463 |
| | | | | 375/240.02 |
| 2015/0134735 | A1* | 5/2015 | Momchilov | G09G 5/14 |
| | | | | 709/203 |
| 2021/0133241 | A1* | 5/2021 | Xu | G06F 3/04847 |
| 2021/0312891 | A1* | 10/2021 | Bae | G06T 9/002 |
| 2022/0382572 | A1 | 12/2022 | Lv et al. | |
| 2023/0064996 | A1* | 3/2023 | Harshith | H04L 63/10 |
| 2023/0098395 | A1* | 3/2023 | O'Leary | H04N 7/15 |
| | | | | 348/14.03 |
| 2023/0367534 | A1* | 11/2023 | Cui | G06F 3/1454 |
| 2024/0319949 | A1* | 9/2024 | Lv | G06F 9/452 |

\* cited by examiner

200

300

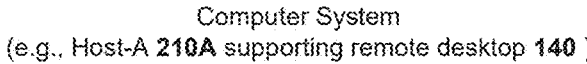

Computer System
(e.g., Host-A 210A supporting remote desktop 140 )

310
Establish connection between remote desktop
with client device operated by USER2

320
Obtain configuration information (configInfo)
identifying sensitive information to be protected,
where configInfo={Xi} for i=1,...,N

321 Obtain configInfo identifying
Xi = app (e.g., email app)

322 Obtain configInfo identifying
Xi = information item (e.g., file, email, source
code, etc.)

330
Based on configInfo, monitor Xi to determine
whether Xi = ACTIVE

340
Detect (a) screen sharing = ENABLED on remote
desktop and (b) Xi = ACTIVE (e.g., launched
before/during screen sharing)

350
Perform remediation action(s) to protect sensitive
information from being shared with USER2

351 Close Xi running on remote desktop

352 Relaunch Xi in UI (e.g., seamless
window) that is not shared with USER2

VMware Horizon Client     − □ ×

Applications

Shortcuts

Geolocation

Calls and Sharing

Plugin Update/Install

2019_VDI

2022_2_RDSH

RDSH_2022 ubuntu2004 win10x64_2009 win10x64_22H2

Remote desktop: win10x64_22H2 _610_

*Connect via*

| VMware Blast      ∨ |

*Display*

| Fullscreen – All Monitors    ∨ |

*Autoconnect to this desktop*

( ◯ )   Off

*Allow dynamic scaling*

(   ◯ )   On

*Select sensitive apps for screen sharing on remote desktop* _620_

☑ A      ☑ B      ☐ C

*Add link to sensitive information items (e.g., files) for screen sharing on remote desktop* _630_

| .../sensitive_folder/ |

⇩

640/123/142

```
configInfo = (X1=A,
              X2=B,
              X3=ITEM1,
              X4=ITEM2,
              ...)
```

*Examples*
*Sensitive applications:* X1,X2
*Sensitive information items:* ITEM1,ITEM2

SENSITIVE INFORMATION PROTECTION DURING SCREEN SHARING ON REMOTE DESKTOPS

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same server, computer, or other physical machine (e.g., referred to as a "host"). Each VM is generally provisioned with virtual resources to run an operating system and applications. The virtual resources may include central processing unit (CPU) resources, memory resources, storage resources, network resources, etc. In practice, a VM may be configured to support a remote desktop to allow an end user to access various applications supported by the remote desktop. When screen sharing is enabled on the remote desktop during a meeting, however, there is a risk of accidental disclosure of sensitive information to other meeting attendees.

SUMMARY

According to examples of the present disclosure, sensitive information may be better protected during screen sharing on remote desktops in a virtualized desktop infrastructure (VDI) environment. One example method may involve a computer system establishing a connection between a remote desktop running on a virtualized computing instance supported by the computer system and a client device operated by a first user to allow access to multiple applications supported by the remote desktop. The computer system may obtain configuration information identifying sensitive information that requires protection. For example, the sensitive information may include at least a particular application from the multiple applications, or an information item associated with the particular application.

Based on the configuration information, the computer system may monitor the particular application or the information item. In response to detecting that (a) screen sharing is enabled for the first user to share a visual representation associated with the remote desktop with a second user and (b) the particular application or the information item being monitored is active, the computer system may perform a remediation action to protect against potential disclosure of the sensitive information to the second user during screen sharing.

Examples of the present disclosure may further include a non-transitory computer-readable storage medium that includes a set of instructions which, in response to execution by a processor of a computer system, cause the processor to perform aspect(s) of the above method, as well as a computer system configured to implement aspect(s) of the above method.

BRIEF DESCRIPTION OF DRAWINGS

FIG. 3 is a flowchart of an example process for a computer system to perform sensitive information protection during screen sharing on a remote desktop.

FIG. 6 is schematic diagram illustrating an example user interface (UI) for generating configuration information identifying sensitive information that requires protection during screen sharing on a remote desktop.

DETAILED DESCRIPTION

Figure 1:
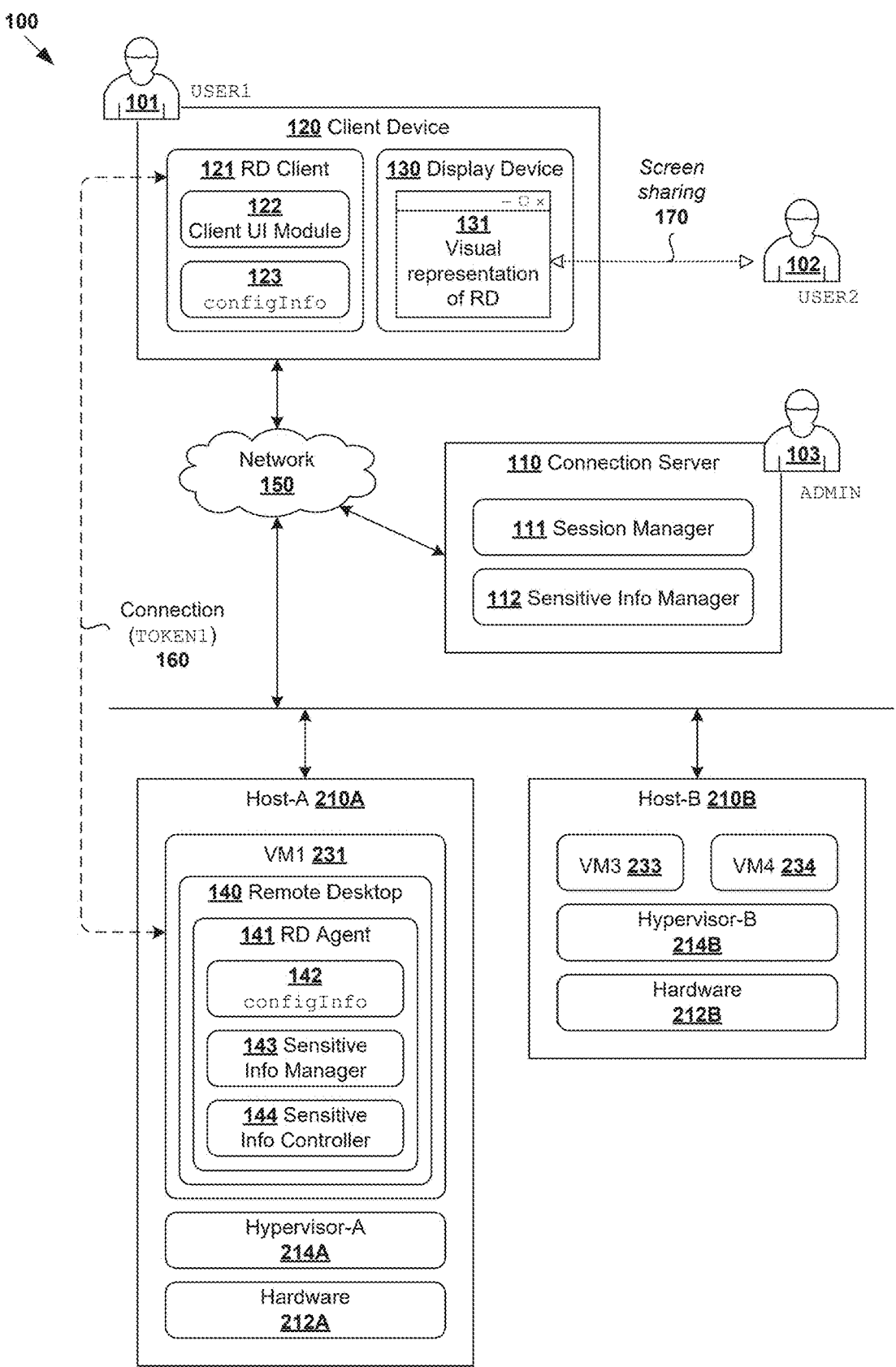
FIG. 1 is a schematic diagram illustrating an example virtualized desktop infrastructure (VDI) environment in which sensitive information protection may be performed during screen sharing on a remote desktop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, may be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

FIG. 1 is a schematic diagram illustrating example virtualized desktop infrastructure (VDI) environment 100 in which sensitive information protection may be performed during screen sharing on a remote desktop. It should be understood that, depending on the desired implementation, VDI environment 100 may include additional and/or alternative components than that shown in FIG. 1. As used herein, the term "VDI environment" (also known as a "remote desktop computer system") may refer generally to any suitable network environment that allows a client device to connect with a remote desktop to access application(s) supported by the remote desktop. In the example in FIG. 1, VDI environment 100 may include (a) client device 120 operated by an end user (e.g., USER1 101), (b) remote desktop 140 supported by physical host 210A and (c) connection server 110 (also known as a "connection broker") to facilitate connection or session establishment between client device 120 and remote desktop 140.

Client device 120 may support remote desktop (RD) client 121 ("RD client" for short) to access or launch remote desktop 140 on a virtualized computing instance in the form of virtual machine (VM) 231 hosted by host 210A. Remote desktop 140 may support remote desktop (RD) agent 141 ("RD agent") to facilitate communication with RD client 121 running on client device 120. As used herein, the term "desktop" may refer generally to an instance of an interactive operating environment provided by a computer operating system (OS) and software application(s). The term "remote desktop" may refer generally to a software feature or program that allows an end user to access and control a desktop running on a machine from another location over a network. For example, using RD client 121, USER1 101 operating client device 120 may access remote desktop 140 via network 150 using any suitable computer system installed with RD client software, such as VMware Horizon®, etc. This allows USER1 101 to access various software applications and files and perform tasks remotely.

When remote desktop 140 is launched, connection server 110 may facilitate the establishment of a connection or communication channel (see 160) between RD client 121 and RD agent 141 of remote desktop 140. For example, this may involve connection server 110 requesting a session token from remote desktop 140 and providing the session token to client device 120. This way, RD client 121 may interact with RD agent 141 to establish a connection using the session token and a virtual channel for transferring variable data between them. Input events initiated using client device 120 may be transmitted from RD client 121 to RD agent 141 via connection 160. Depending on the desired implementation, remote desktop 140 and client device 120 may establish connection 160 by interacting or communicating with each other either (a) directly or (b) indirectly via connection server 110 acting as an intermediary. As used herein, the term "connection server" may refer generally to a computer system that is capable of communicating or interacting with a client device and a remote desktop to facilitate connection establishment between them. In practice, connection server 110 may be implemented using physical machine(s) and/or virtualized computing instance(s).

Any suitable input device(s) associated with client device 120 may be used to detect the input event(s), such as mouse click(s), keyboard input(s), finger gesture(s) on a touchscreen, etc. Based on the input event(s), user interface (UI) information associated with remote desktop 140 may be transmitted from RD agent 141 to RD client 121 via connection 160. The UI information may be used to generate a visual representation or image (see 131) of remote desktop 140 for display on display device 130 associated with client device 120, such as a touchscreen or external monitor, etc. Visual representation 131 of remote desktop 140 may be updated in response to input event(s) received via connection 160.

Depending on the desired implementation, connection server 110 may represent a single server, or a pool of servers. Each connection server may run on a physical machine and/or VM(s). It should be understood that VDI environment 100 may include any additional and/or alternative components. For example, VDI environment 100 may further include a domain controller (e.g., Microsoft® Active Directory®) that manages user accounts, including user login information, etc. Connection server 110 and the domain controller may run on separate servers or in separate VMs running on the same server or different servers.

Physical Implementation View

Figure 2:
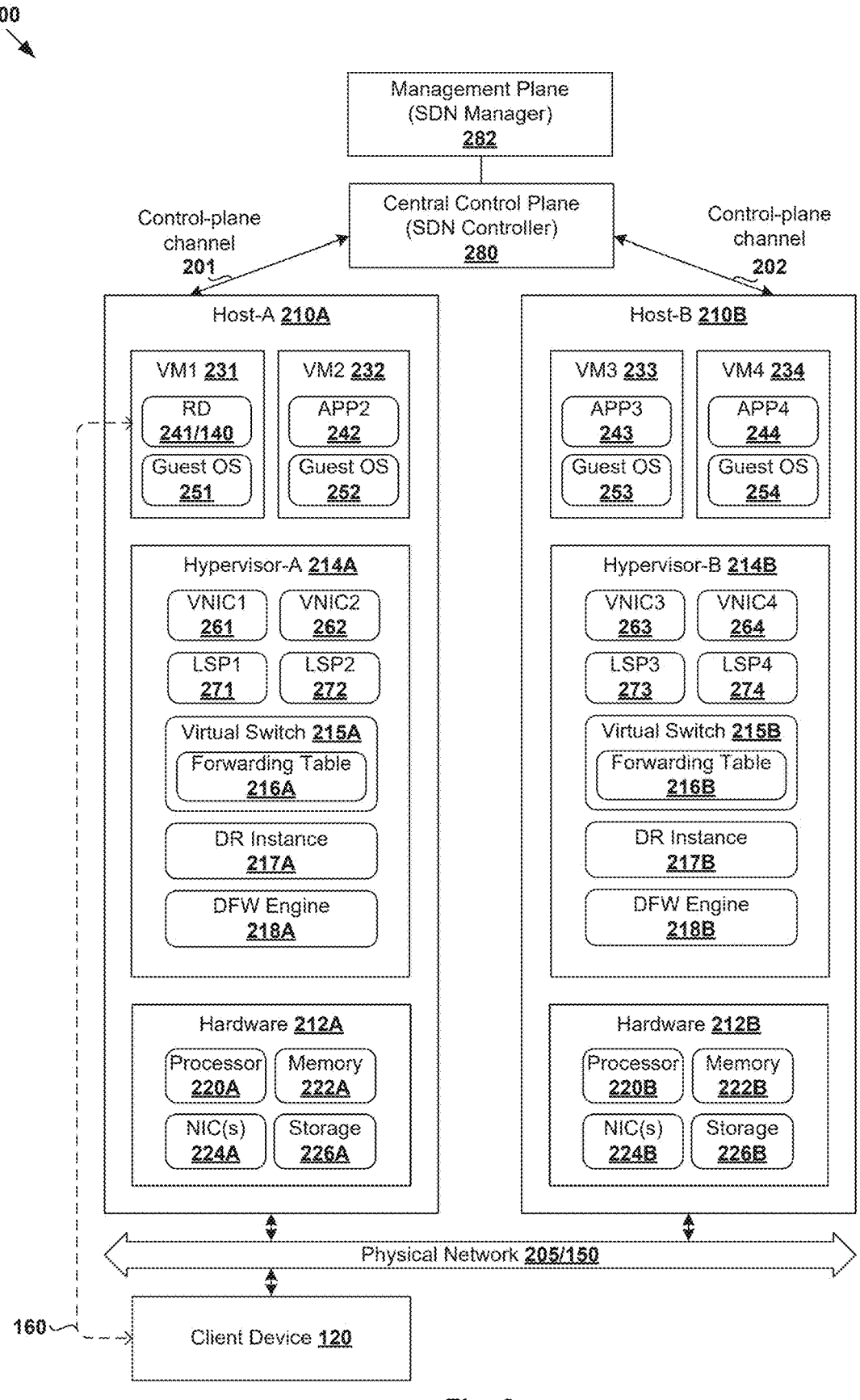
FIG. 2 is a schematic diagram illustrating an example software-defined networking (SDN) environment capable of supporting remote desktops.

Physical hosts such as host-A 210A will be described further using FIG. 2, which is a schematic diagram illustrating example software-defined networking (SDN) environment 100 capable of supporting remote desktops. In the examples in FIGS. 1-2, host 210A/210B may include suitable hardware 212A/212B and virtualization software (e.g., hypervisor-A 214A, hypervisor-B 214B) to support various VMs. For example, host-A 210A may support VM1 231 (on which remote desktop 140 is running) and VM2 232. Host-B 210B may support VM3 233 and VM4 234. Although not shown for simplicity, VM 232/233/234 may also support a remote desktop. Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc. In practice, host 210A/210B may be referred to as a "computer system," "computing device", "host computer", "host device", "physical server", "transport node," etc.

Hypervisor 214A/214B maintains a mapping between underlying hardware 212A/212B and virtual resources allocated to respective VMs. Virtual resources are allocated to respective VMs 231-234 to support a guest operating system (OS; not shown for simplicity) and application(s); see 241-244, 251-254. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware LLC), Kernel-based Virtual Machine (KVM), etc. The term "packet" may refer generally to a group of bits that may be transported together, and may be in another form, such as "frame," "message," "segment," etc. The term "traffic" or "flow" may refer generally to multiple packets. The term "layer-2" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

SDN controller 280 and SDN manager 282 are example network management entities in SDN environment 100. One example of an SDN controller is the NSX controller component of VMware NSX® (available from VMware LLC) that operates on a central control plane. SDN controller 280 may be a member of a controller cluster (not shown for simplicity) that is configurable using SDN manager 282. Network management entity 280/282 may be implemented using physical machine(s), VM(s), or both. To send or receive control information, a local control plane (LCP) agent (not shown) on host 210A/210B may interact with SDN controller 280 via control-plane channel 201/202.

Through virtualization of networking services in SDN environment 100, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, VMs 231-234. In SDN environment 100, logical switches and logical DRs may be implemented in a distributed manner and can span multiple hosts.

For example, a logical switch (LS) may be deployed to provide logical layer-2 connectivity (i.e., an overlay network) to VMs 231-234. A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables (not shown) at respective DR instances 217A-B. Each routing table may include entries that collectively implement the respective logical DRs.

Packets may be received from, or sent to, each VM via an associated logical port. For example, logical switch ports 271-274 (labelled "LSP1" to "LSP4") are associated with respective VMs 231-234. Hosts 210A-B may maintain data-plane connectivity with each other via physical network 205 to facilitate east-west communication among VMs 231-234. To protect VMs 131-134 against security threats, hypervisor 214A/214B implements distributed firewall (DFW) engine 218A/218B to filter packets to and from associated VMs. For example, at host-A 110A, hypervisor 214A implements DFW engine 218A to filter packets for VMs 231-232.

Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Screen Sharing

Screen sharing is a collaborative technology that allows one user (e.g., USER1 101) to share their computer screen with at least one other user (e.g., USER2 102) over a network (e.g., Internet). Screen sharing facilitates real-time interaction where users 101-102 may view exactly the same interface during a screen sharing session (see 170 in FIG. 1). The use cases of screen sharing are diverse. For example, participants located in dispersed geographical locations may share screen(s) during virtual meetings, presentations or brainstorming sessions. For training and education purposes, instructors may guide learners and demonstrate software during screen sharing. For technical demonstration purposes, developers may showcase features or prototypes to stakeholders. The benefits of screen sharing include real-time communication, visual clarity, more efficient problem-solving, collaborative work and cost-effectiveness.

Screen sharing 170 may be enabled using any suitable application(s) supported by remote desktop 140, such as unified communications (UC) applications that include Zoom® (available from Zoom Video Communications, Inc.), Microsoft® Teams (available from Microsoft Corporation), etc. Depending on the desired implementation, a UC application may be any suitable software that integrates multiple enterprise communication tools (e.g., voice calling, video conferencing, instant messaging, content sharing, etc.) into a single, streamlined interface. UC applications are designed to improve user experience and productivity and typically used in business environments to facilitate communication and collaboration among team members.

In practice, sensitive information may be inadvertently disclosed to other meeting attendees during screen sharing. For example in FIG. 1, USER1 101 may accidentally expose sensitive information to USER2 102, such as personal emails, sensitive documents, internal workflow information and chat messages, etc. Failure to close unnecessary files, windows or applications before screen sharing may lead to unintended exposure of sensitive data. Although some UC applications allow the sharing of a particular application instead of the entire remote desktop, some users might find it inconvenient to re-select shared applications when they wish to share other applications.

Further, notifications (e.g., email pop-ups) displaying sensitive information (e.g., emails and email application) may appear on a shared screen without any prior notice during screen sharing. This may occur even a window associated with the application is minimized. Accidental disclosure of sensitive information is undesirable because it may lead to personal, business and/or legal consequences, such as security breach, privacy data leak, identity theft, reputation damage, breach of confidentiality, loss of trust, etc.

Sensitive Information Protection

According to examples of the present disclosure, sensitive information may be better protected to reduce the risk of accidental disclosure during screen sharing on remote desktops. As used herein, the term "sensitive information" may refer generally to any information that should be protected against unwarranted or unauthorized disclosure, such as content of application(s), information item(s), etc. Depending on the desired implementation, the sensitive information may be designated as sensitive, confidential, classified, private or the like by an individual or organization.

As used herein, the term "application" may refer generally to a computer program that may be launched on a computer system, such as an email application, communication-related application (e.g., cloud-based team communication application), web application, office productivity application (e.g., for creating and modifying spreadsheets, presentations, letters and other office documents), image/video editing application, source code editing application, etc. The term "information item" (also known as "information object" or "digital content") may refer generally to any suitable content that may be viewed, created or modified using an application. For example, an information item may be any suitable file or file type, such as email, office document, portable document format (PDF) file, source code, image, video, etc.

Examples of the present disclosure may be implemented using any suitable "computer systems," such as host-A 210A that is capable of supporting VM1 231 on which remote desktop 140 is running; client device 120; and connection server 110 that facilitates connection establishments between remote desktop 140 and client device 120. In the example in FIG. 1, remote desktop 140 may include various components/modules to implement sensitive information protection, including RD agent 141, sensitive information manager 143 and sensitive information controller 144. Client device 120 may implement various components/modules, such as RD client 121 and client UI module 122. Connection server 110 may implement various components/modules, such as session manager 111 and sensitive information manager 112. These components will be explained further below.

Some examples will be described using FIG. 3, which is a flowchart of example process 300 for a computer system to perform sensitive information protection during screen sharing on remote desktop 140. Example process 300 may include one or more operations, functions, or actions illustrated by one or more blocks, such as 310 to 350. Depending on the desired implementation, various blocks may be combined into fewer blocks, divided into additional blocks, and/or eliminated.

At 310 in FIG. 3, a connection (see 160 in FIG. 1) may be established between remote desktop 140 running on VM1 231 supported by host-A 210A and client device 120 operated by first user 101 to access multiple applications supported by remote desktop 140. Establishment of connection 160 may be facilitated by connection server 110.

At 320 in FIG. 3, remote desktop 140 on host-A 210A may obtain configuration information identifying sensitive information that requires protection during screen sharing. The sensitive information may include at least one of the following: (a) a particular application from the multiple applications supported by remote desktop 140 and (b) an information item associated with the particular application. For example, the configuration information may be denoted as configInfo={Xi}, where i=1, . . . , N. As will be described further using FIGS. 4-6, remote desktop 140 may receive configInfo from client device 120 via connection 160.

At 330 in FIG. 3, based on the configuration information, remote desktop 140 on host-A 210A may monitor (b) the particular application and/or (b) the information item. At 340 and 350, in response to detecting that (a) screen sharing=ENABLED for the first user to share visual representation 131 associated with remote desktop 140 with second user 102 and (b) the particular application or the information item=ACTIVE, performing remediation action(s) to protect against potential disclosure of the sensitive information to second user 102 during screen sharing.

Examples of the present disclosure may be implemented to gracefully protect sensitive information during screen sharing on remote desktops to reduce the risk of unauthorized access and potential misuse of sensitive information. As will be described further using FIGS. 4-9, blocks 330-340 may involve sensitive information controller 144 (also referred to as "controller" for simplicity) of remote desktop 140 determining whether a particular Xi=ACTIVE (e.g., application is launched or file is opened before or during screen sharing) based on event notification(s) from sensitive information manager 143. Sensitive information controller 144 may determine whether screen sharing=ENABLED by monitoring UC application(s) running on remote desktop 140, such as using UC app event tracker 145 in FIG. 5 (to be explained below).

Figure 7:
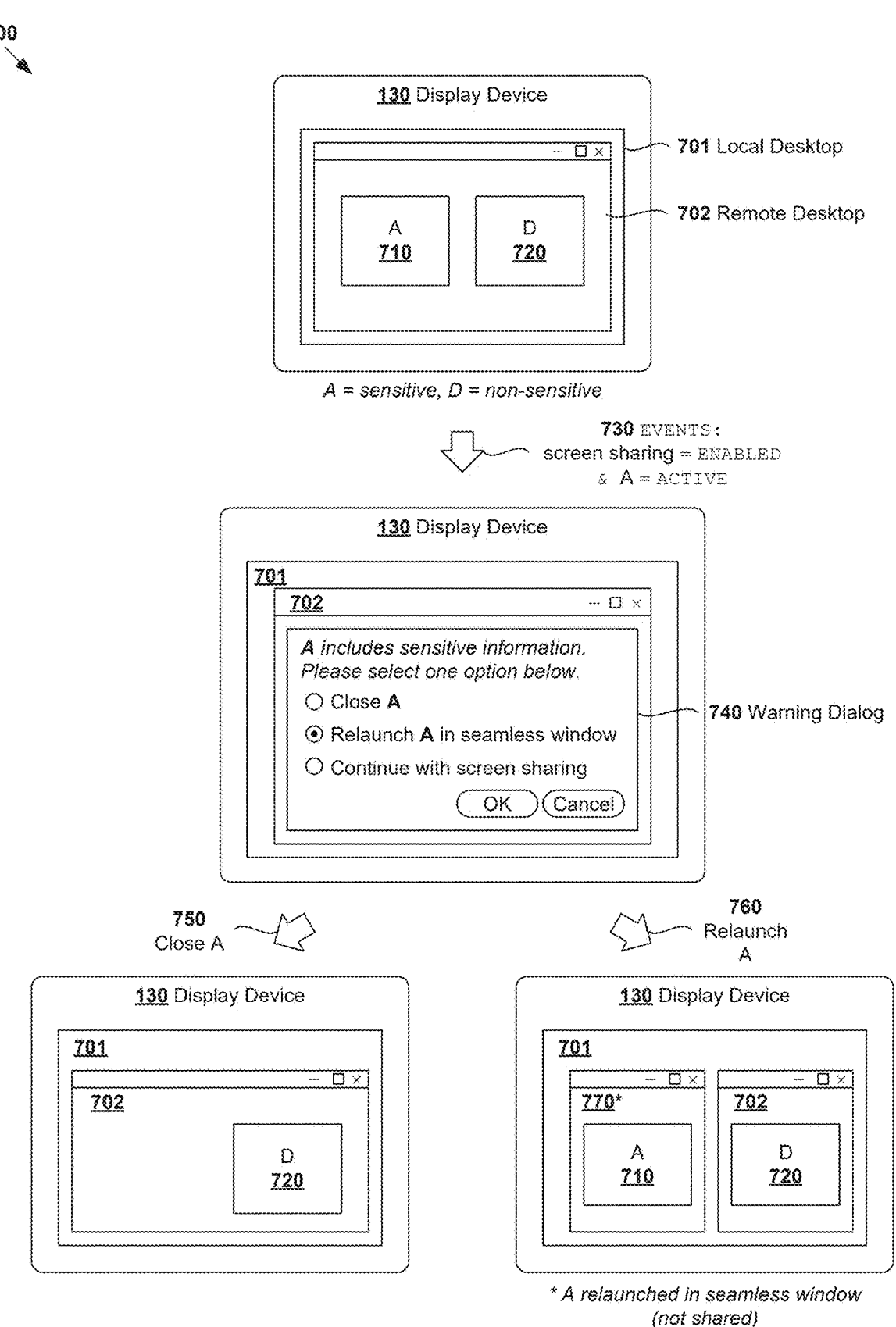
FIG. 7 is a schematic diagram illustrating an example of sensitive information protection using a series of UIs.

Any suitable remediation action may be performed at block 350 based on a selection by USER1 101 operating client device 120 (e.g., via dialog window 740 in FIG. 7). In one example (see 351 in FIG. 3), the particular application or information item may be closed on remote desktop 140. In another example (see 352 in FIG. 2), the particular application or information item may be relaunched on a UI (e.g., includes seamless window 770 in FIG. 7) that is not shared with USER2 102. Some examples relating to a seamless window feature will be explained using FIGS. 7-9. Note that USER1 101 may select to continue with screen sharing without closing or relaunching any application or information item (not recommended).

Example Configuration and Connection Establishment

Figure 4:
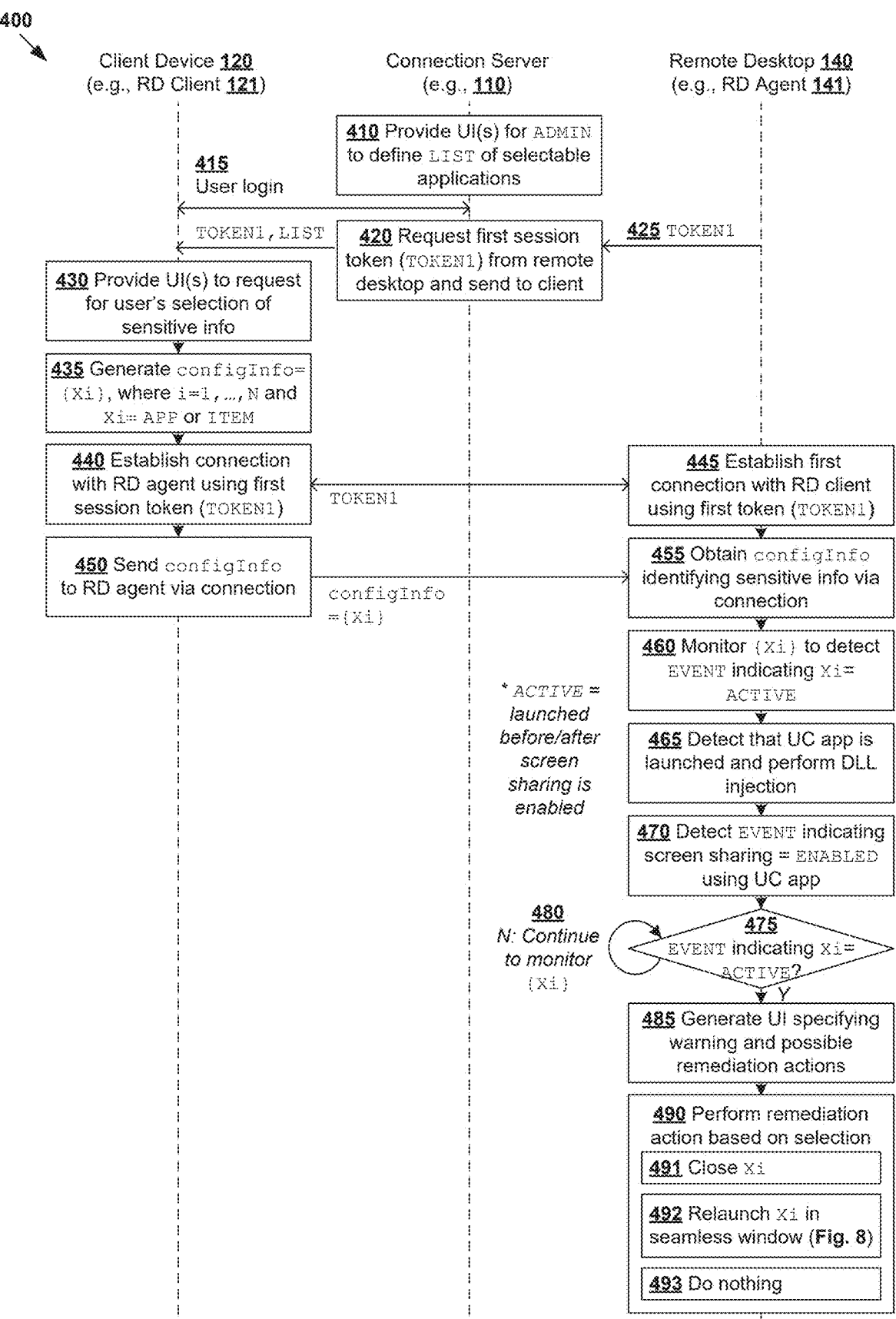
FIG. 4 is a flowchart of an example detailed process for a computer system to perform sensitive information protection during screen sharing on a remote desktop.

FIG. 4 is a flowchart of example detailed process 400 for a computer system to perform sensitive information protection during screen sharing on remote desktop 140. Example process 400 may include one or more operations, functions, or actions illustrated by one or more blocks, such as 410 to 493. Depending on the desired implementation, various blocks may be combined into fewer blocks, divided into additional blocks, and/or eliminated. Some examples will be described using FIG. 5, which is a schematic diagram illustrating example sensitive information protection 500 according to the example detailed process in FIG. 4.

As used herein, the term "UI" (also known as "UI view") may refer generally to a set of UI element(s) that may be generated and displayed on a display device. The term "UI element" may refer generally to a graphical (i.e., visual) and/or textual element that may be displayed on display device 130, such as shape (e.g., circle, rectangle, ellipse, polygon, line, etc.), window, dialog, modal, panel or pane, radio button, check box, menu, dropdown box, editable grid, section, slider, text box, text block, toggle switch (on/off button), or any combination thereof. UIs may be displayed side by side or nested inside of each other to create more complex layouts.

(a) Login Process

At 410 in FIG. 4, connection server 110 may provide any suitable UI(s) for network administrator 103 to define a list of potential sensitive information. For example, a list of applications selectable by end users (e.g., USER1 101) at block 430 below may be defined. In the example in FIG. 5, connection server 110 may include sensitive information manager 112 that is configured to interact with network administrator 103 to define the list, which is denoted as LIST={A, B, C}. Here, A, B, C may represent sensitive applications. For example, A may be an email application (e.g., Microsoft Outlook® available from Microsoft Corporation), B a cloud-based communication platform (e.g., Slack® from Slack Technologies, LLC) and C a collaboration platform (e.g., Microsoft Teams® from Microsoft Corporation). In practice, LIST may also identify particular file(s) or file type(s) that should be protected. See 510 in FIG. 5.

At 415 in FIG. 4, RD client 121 on client device 120 may generate and send a login request towards connection server 110 to access remote desktop 140 and supported applications. In practice, the login process may involve connection server 110 authenticating USER1 101 using any suitable identity management solution, such as Microsoft® Active Directory®), Identity Manager™ from VMware LLC, etc. USER1 101 may use any suitable credentials (e.g., username and password) during the login process. See 520 in FIG. 5.

Depending on the desired implementation, connection server 110 may include session manager 111 to facilitate connection establishment, such as to authorize and manage sessions between various RD clients and respective RD agents. At 420-425 in FIG. 4, after successful authentication/authorization, connection server 110 may request for a first session token=TOKEN1 from remote desktop 140 and send TOKEN1 towards RD client 121 along with LIST configured by network administrator 103. See also 530-531 in FIG. 5.

(b) Configuration Information

At 430 in FIG. 4, based on at least LIST from connection server 110, client UI module 122 on RD client 121 may generate and provide a UI to request USER1 101 to define or select sensitive information that requires protection during screen sharing. One example is shown in FIG. 6, which is a schematic diagram illustrating example UI 600 for generating configuration information identifying sensitive information that requires protection during screen sharing on remote desktop 140. In this example, UI 600 may facilitate configuration of various settings relating to remote desktop 140 associated with label="win10x64_22H2" (see 610), such as connection settings, display settings, sensitive information settings, etc.

In relation to sensitive application protection (see 620), example UI 600 may include UI elements (e.g., text block and checkboxes) to request for the selection of sensitive application(s) from LIST={A, B, C}. All applications in LIST may be selected by default. In relation to information item protection (see 630), example UI 600 may further include UI elements (e.g., text block and path/link box) to request for a path/link to (a) a particular information item (e.g., email, source code) or (b) a folder that includes multiple information items. Any other suitable configuration approaches may be implemented. For example, instead of linking to a folder or item, UI 600 may facilitate a tagging approach for USER1 101 to assign a tag or label (e.g., sensitive or non-sensitive) on information items that require protection.

At 435 in FIG. 4, based on input information from USER1 101, RD client 121 may generate configuration information (configInfo) that identifies sensitive information requiring protection. As used herein, the term "configuration item" may refer generally to any suitable attribute(s) based on which an application or information item may be identifiable, such as application/item name, application/item identifier (ID), hash information, path information, version information, installation information, metadata, history information, a combination thereof, etc.

For example, configInfo may be denoted as {Xi}, where i=1, . . . , N. Here, Xi may represent a particular application (e.g., email application) or an information item (e.g., email or attachment) associated with the particular application. In a first example, based on input=selection of {A, B}, configInfo may be generated to identify two applications: {X1=A, X2=B}. In a second example, based on input=link to a folder labelled as "sensitive_folder," configInfo may be generated to identify various information items, such as X3=ITEM1 and X4=ITEM2. Note that any suitable size N≥1 may be configured. See 640 in FIG. 6.

(c) Connection Establishment with Remote Desktop

Referring to FIG. 4 again, at 440-445, RD client 121 and RD agent 141 may establish a first connection based on session token=TOKEN1. Further, at 450-455, RD agent 141 may obtain configInfo from RD client 121 via the connection. In practice, RD agent 141 may obtain configInfo from any suitable alternative source, such as connection server 110, a datastore in which configInfo is stored, etc. In the example in FIG. 5, virtual protocol channel components 125, 149 may be configured to facilitate data transfer between RD client 121 on client device 120 and RD agent 141 on remote desktop 140 via the first connection. See also 550-551 in FIG. 5.

Screen Sharing

At 460 in FIG. 4, based on configInfo, RD agent 141 may monitor sensitive information that requires protection during screen sharing. Block 445 may be implemented using sensitive information monitor 143 and sensitive information controller 144 of RD agent 141. In the example in FIG. 5, sensitive information monitor 143 may monitor event(s) associated with Xi∈configInfo. In response to detecting a launch/open event associated with Xi, sensitive information monitor 143 may generate and send an event notification to sensitive information controller 144. This way, based on the notification, sensitive information controller 144 may detect a launch of Xi in order to track which Xi=ACTIVE. Block 445 may be performed to detect Xi=ACTIVE before or after screen sharing is enabled. See 560 in FIG. 5.

At 465 in FIG. 4, RD agent 141 may monitor a UC application that is running on remote desktop 140 and configured with a screen sharing function. Further, at 470, RD agent 141 may detect that screen sharing=ENABLED, such as detecting a click event initiated by USER1 101 to click a screen sharing button to start a meeting with USER2 102 using the UC application. In practice, blocks 465-470 may be implemented using sensitive information controller 144 and UC app event tracker 145 (referred to as "event tracker" for simplicity).

In more detail, event tracker 145 may include a dynamic link library (DLL) that is configured to (a) monitor application/file events and (b) send notifications/reports relating to these events to sensitive information controller 144. Event tracker 145 may be injected into an UC application process using any suitable approach, such as DLL injection driver(s). Once injected, the DLL may hook application programming interface (API) functions and/or system calls relating to screen sharing so that it may be called when screen sharing is enabled or disabled. Once the DLL is called by event tracker 145, an event notification indicating screen sharing=ENABLED may be generated and sent towards sensitive information controller 144. See 570 in FIG. 5 ("SS" represents screen sharing). Any additional and/or alternative approach for code injection and API redirection may be implemented.

Remediation Actions

At 470-475 in FIG. 4, sensitive information controller 144 may detect whether Xi=ACTIVE when screen sharing=ENABLED, which indicates potential disclosure of sensitive information during screen sharing. Blocks 470-475 may be based on (a) a first event notification from event tracker 145 and (b) a second event notification from sensitive information monitor 143. If not ACTIVE (see 465), monitoring of {Xi} may continue. Otherwise (see 470), sensitive information controller 144 may instruct or cause agent UI module 146 to generate and provide a UI (e.g., warning dialog) to warn USER1 101 about potential disclosure of sensitive information and to request selection of a remediation action. See 580 in FIG. 5.

FIG. 7 is a schematic diagram illustrating example sensitive information protection 700 using a series of UIs. Here, once USER1 101 has logged into remote desktop 140, visual representations 701-702 may be displayed on display device 130 associated with client device 120. Here, first visual representation 701 may represent a UI that includes various UI elements for interacting with applications running on a local desktop supported by client device 120 and/or information items accessible via the local desktop (e.g., stored on local drive). In contrast, second visual representation 702 may represent a UI that includes various UI elements for interacting with applications running on remote desktop 140 as well as information items accessible via remote desktop 140. For simplicity, visual representations 701-702 will also be referred to as local desktop and remote desktop below, respectively.

At 710-720 FIG. 7, two applications (denoted as A and D) are launched on remote desktop 702 either before or after screen sharing is enabled using a UC application. First application=A may be configured by USER1 101 to be sensitive using the example in FIG. 6, while second application=D is non-sensitive.

Figure 5:
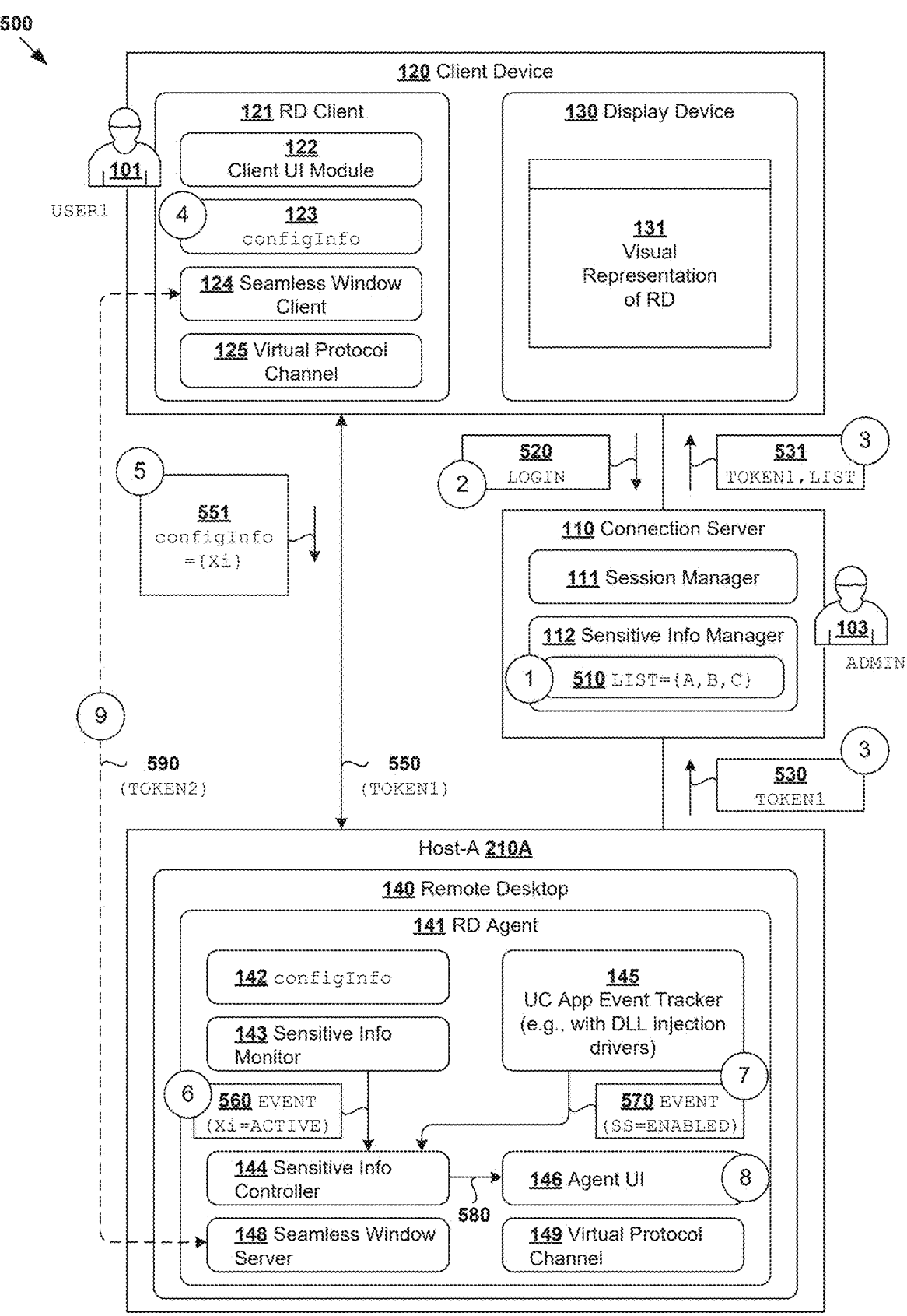
FIG. 5 is schematic diagram illustrating example sensitive information protection according to the example detailed process in FIG. 4.

At 730 in FIG. 7, sensitive information controller 144 may determine that sensitive information protection is required in response determination that (a) application A=ACTIVE and (b) screen sharing=ENABLED based on event notifications from respective sensitive information monitor 143 and event tracker 145 (see also 560-570 in FIG. 5). In response, at 740, sensitive information controller 144 may cause agent UI module 146 to generate and provide a UI in the form of a warning dialog window on remote desktop 702.

For example, warning dialog window 740 may include a text block specifying "A includes sensitive information" to warn USER1 101 of potential disclosure of sensitive information. Warning dialog window 740 also includes three radio buttons to facilitate selection of one of the following remediation actions: close A, relaunch A in an UI element that includes a seamless window (i.e., as a seamless application) and continue with screen sharing. In response to detecting the selection of "Continue with screen sharing," no additional operation is required (i.e., do nothing) and application A will remain on remote desktop 702. See also 485 and 490-493 in FIG. 4.

At 750 in FIG. 7, in response to detecting the selection of "Close A" on warning dialog window 740, sensitive information controller 144 may close A on remote desktop 140. At 760-770, in response to detecting the selection of "Relaunch A as seamless window" on warning dialog window 740, sensitive information controller 144 may close A on remote desktop 140 and instruct or request seamless window server 148 to interact with seamless window client 124 to relaunch A in a separate UI that includes seamless window (see 770). This way, seamless window 770 may be generated to be separate from (i.e., not part of) visual representation 702 and therefore not shared during screen sharing. See 590 in FIGS. 5 and 770 in FIG. 7. A detailed example will be discussed below using FIGS. 8-9.

Seamless Window Feature

As used herein, the term "seamless window" may refer generally to a feature that allows a user to interact with an application running on remote desktop 140, or an information item associated with the application, as if it were a native application/item on client device 120. Any suitable software may be supported by client device 120 and remote desktop 140 to implement the seamless window feature, such as the Seamless Window feature from VMware LLC. In practice, the seamless window may be implemented using a UI that is distinct from remote desktop 140. When screen sharing is enabled on remote desktop, an application may be launched in a seamless window that is not shared, thereby enhancing sensitive information protection.

Figure 8:
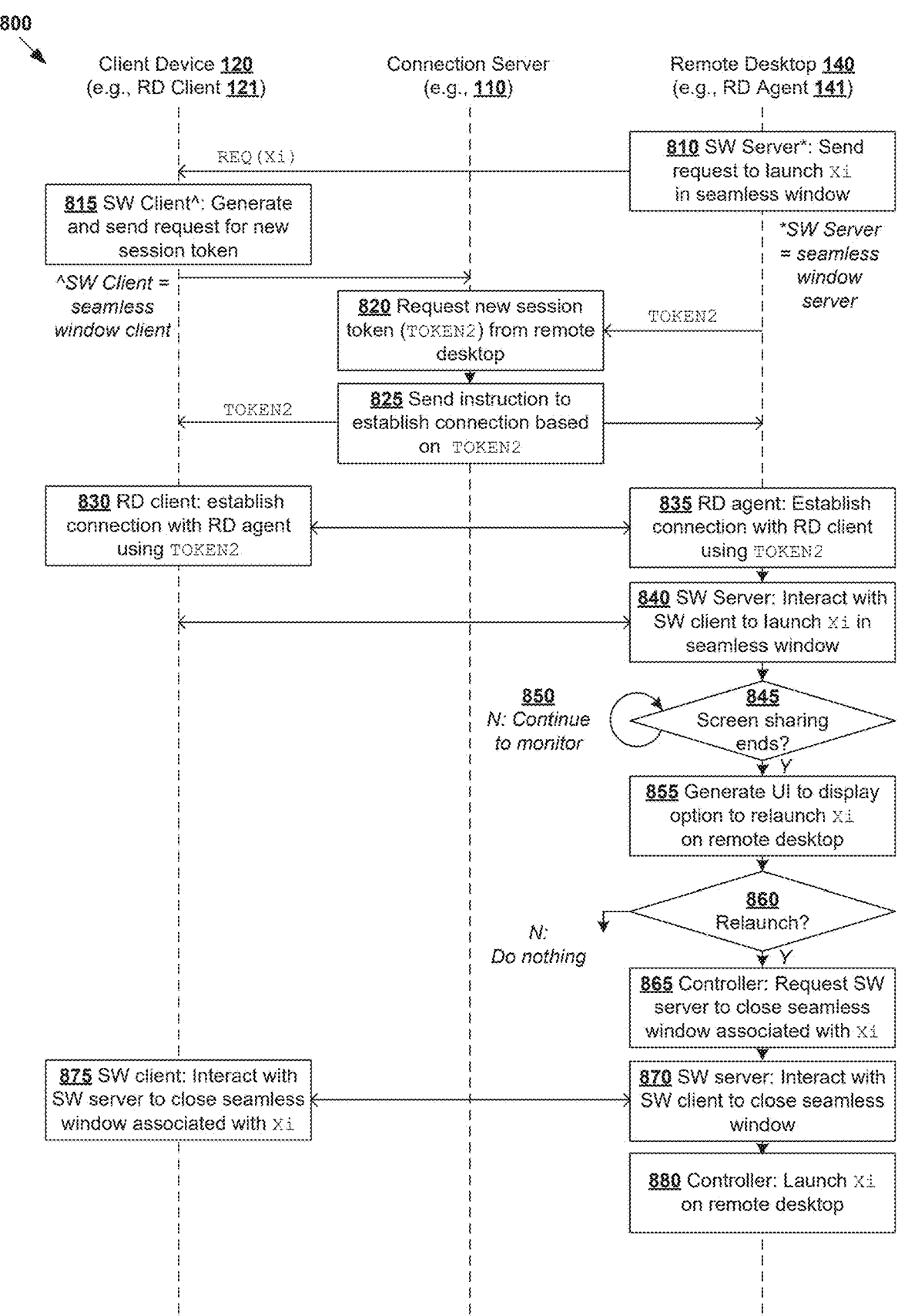
FIG. 8 is a flowchart of an example detailed process for a computer system to perform sensitive information protection that involves launching an application or information item on a UI in the form of a seamless window.

FIG. 8 is a flowchart of example detailed process 800 for a computer system to perform sensitive information protection that involves launching an application or information item on a UI in the form of a seamless window. Example process 800 may include one or more operations, functions, or actions illustrated by one or more blocks, such as 810 to 880. Depending on the desired implementation, various blocks may be combined into fewer blocks, divided into additional blocks, and/or eliminated. The examples in FIG. 8 may be implemented using sensitive information controller 144, seamless window server 148 and seamless window client 124.

As used herein, terms "seamless window client" and "seamless window server" may refer generally to any suitable software components/modules that are capable of acting as respective client and server to interact with each other and to launch/close a seamless window according to examples of the present disclosure. Seamless window server 148 and seamless window client 124 may launch/close seamless windows based on instruction(s) from sensitive information controller 144. In practice, any suitable approach may be implemented to provide the seamless window feature, such as using the seamless window client and the seamless window server of VMware Horizon®, etc.

(a) Seamless Window

At 810 in FIG. 8, seamless window server 148 may send a request towards seamless window client 124 to relaunch application A in a seamless window (i.e., switching to seamless mode). In practice, sensitive information controller 144 may send the request to seamless window server 148, which then forwards the request to seamless window client 124 together with any suitable information identifying A.

At 815 in FIG. 8, seamless window client 124 may generate and send a request towards connection server 110 to generate a new session token. At 820-825, connection server 110 may request remote desktop 140 to generate a second session token denoted as TOKEN2, which is subsequently sent towards seamless window client 124. This way, at 830-835 in FIG. 8, RD agent 141 of remote desktop 140 may establish a second connection (i.e., new session) with RD client 121 of client device 120 using TOKEN2.

At 840 in FIG. 8, seamless window server 148 may interact with seamless window client 124 to relaunch application A as a seamless application in a seamless window using the second connection associated with TOKEN2. Using this approach, application A is still supported by remote desktop 140 but appears in a seamless window that is launched using a different connection/session.

Referring to FIG. 7 again, seamless window 770 represents a UI that appears to be separate from remote desktop 702. This gives USER1 101 the illusion that A is a local application running on local desktop 701 since it is not displayed as part of remote desktop 702. Since screen sharing is not enabled on seamless window 770, this protects sensitive information associated with application A from being disclosed to other meeting attendees during screen sharing.

(b) Relaunch on Remote Desktop

At 845 in FIG. 8, sensitive information controller 144 may monitor whether screen sharing has ended (i.e., not ENABLED) on remote desktop 140. Similar to block 455 in FIG. 4, block 845 may be performed based on event notification(s) from event tracker 145 capable of monitoring UC applications and deactivation of their screen sharing function. If not ended, at 850, sensitive information controller 144 may continue to monitor for event notification(s) indicating the end of screen sharing.

Otherwise (ended), at 855, sensitive information controller 144 may instruct agent UI module 146 to generate UI specifying an option to relaunch A on remote desktop 140 (i.e., exit seamless mode). An example is shown in FIG. 9, which is a schematic diagram illustrating example sensitive information protection that involves relaunching an application on remote desktop 140 after screen sharing has ended.

At 910, in response to detecting that screen sharing is not ENABLED and sensitive application A=ACTIVE, UI 920 may be generated and provided to USER1 101. Here, UI 920 may be a dialog window specifying the following option: "Since screen sharing has ended, close A in seamless window and launch A on remote desktop?" Depending on the desired implementation, dialog window 920 may be configured to appear as a pop-up window at a particular area of display device 130, such as bottom right corner of the screen.

Figure 9:
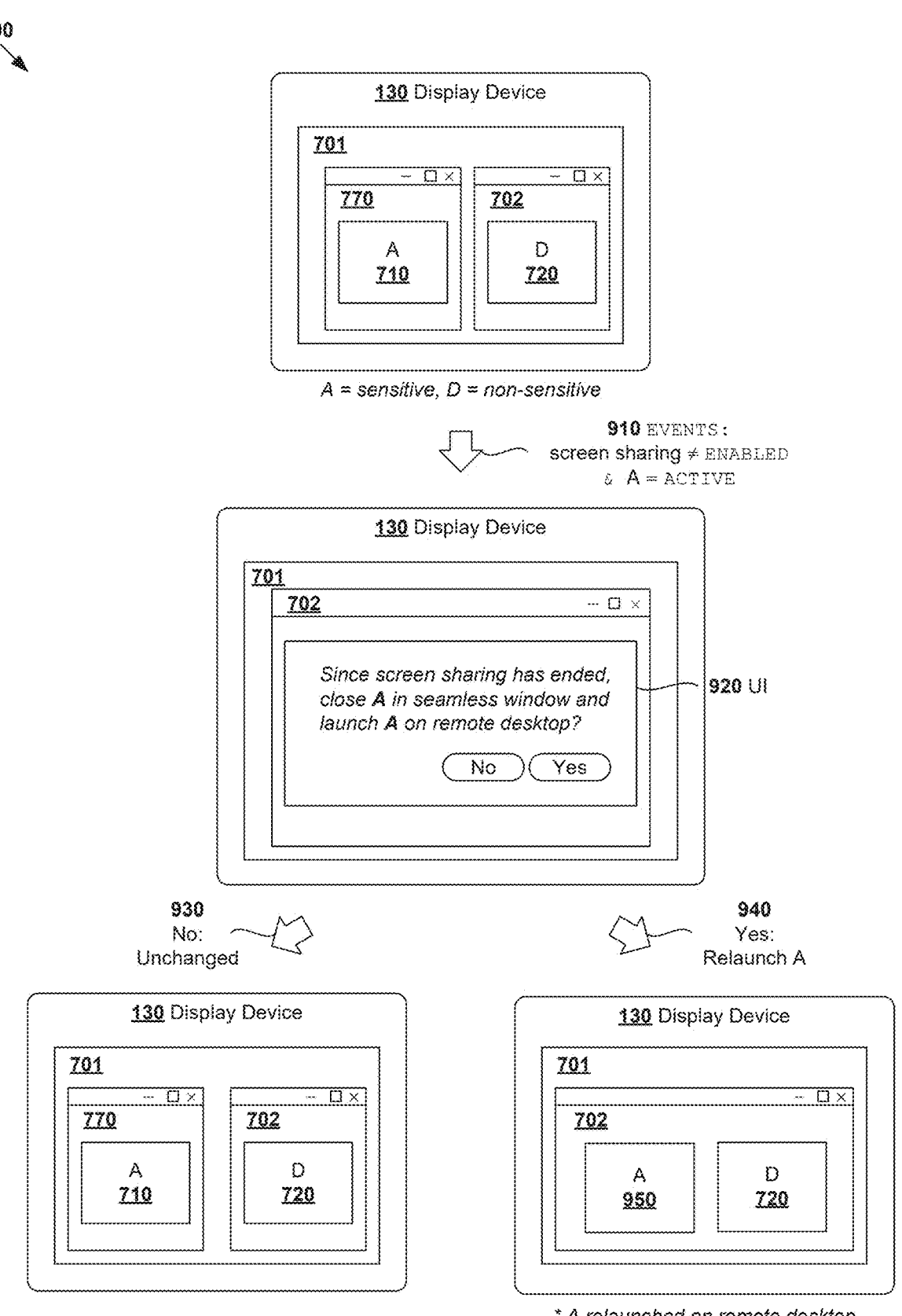
FIG. 9 is a schematic diagram illustrating example sensitive information protection that involves relaunching an application on a remote desktop after screen sharing has ended.

At 930 in FIG. 9, if "No" is selected using dialog window 920, no change is made. In this case, application A appears to be running as a seamless application on seamless window 770 while D appears to be running on remote desktop 702.

At 940 in FIG. 9, if "Yes" is selected using dialog window 920, seamless window 770 may be closed, and application A relaunched on remote desktop 702. In this case, both applications A and D are shown to be running on remote desktop 702. In practice, based on a request from sensitive information controller 144, seamless window server 148 may interact with seamless window client 124 to close application seamless window 770 and relaunch application A on remote desktop 702. See also 865-880 in FIGS. 8 and 950 in FIG. 9.

Using examples of the present disclosure, sensitive information may be better protected against accidental disclosure. This also improves user experience relating to screen sharing on remote desktop 140. Although some examples are explained using FIGS. 1-9, it should be understood that alternative and/or additional approaches may be implemented. For example, LIST may be a blacklist identifying sensitive applications, or a whitelist identifying non-sensitive applications (i.e., an application not listed in the whitelist is considered to be sensitive).

Computer System

The above examples may be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to the drawings.

The techniques introduced above may be implemented in special-purpose hardwired circuitry, in software and/or firmware in conjunction with programmable circuitry, or any combination thereof. Special-purpose hardwired circuitry may be in the form of, for example, one or more application-specific integrated circuits (ASICs), programmable logic devices (PLDs), field-programmable gate arrays (FPGAs), etc. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or any combination thereof.

Those skilled in the art will recognize that some aspects of the embodiments disclosed herein, in whole or in part, may be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples may be arranged in the device in the examples as described or may be alternatively located in one or more devices different from that in the examples. The units in the examples described may be combined into one module or further divided into a plurality of sub-units.

I claim:

1. A method for a computer system to protect sensitive information during screen sharing on a remote desktop in a virtualized desktop infrastructure (VDI) environment that includes the computer system, a client device and a connection server, wherein the method comprises:

establishing, by the computer system, a first connection between the remote desktop running on a virtualized computing instance supported by the computer system and the client device operated by a first user to allow access to multiple applications supported by the remote desktop, wherein establishment of the first connection is facilitated by the connection server;

obtaining, by the computer system, configuration information identifying sensitive information that requires protection during screen sharing of the remote desktop, wherein the sensitive information includes at least a particular application from the multiple applications or an information item associated with the particular application;

monitoring, by the computer system, the particular application or the information item based on the configuration information; and in response to detecting that (a) screen sharing is enabled for the first user to share a visual representation associated with the remote desktop with a second user and (b) the particular application or the information item being monitored is active, establishing a second connection between the remote desktop and the client device that is separate from the first connection used to generate the visual representation associated with the remote desktop; and relaunching, using the second connection, the particular application or the information item in a user interface (UI) element that is excluded from the visual representation shared with the second user.

2. The method of claim 1, further comprising:

closing the particular application or the information item that is active on the remote desktop.

3. The method of claim 1, wherein a seamless window server of the remote desktop interacts with a seamless window client of the client device to relaunch the particular application or the information item on the UI element, wherein the UI element includes a seamless window.

4. The method of claim 3, wherein detecting that screen sharing is enabled comprises:

in response to a determination that screen sharing has ended, (a) the seamless window server interacting with the seamless window client to close the seamless window and (b) a controller of the remote desktop relaunching the particular application or the information item on the remote desktop.

5. The method of claim 1, wherein monitoring the particular application or the information item comprises:

detecting, by a controller of the remote desktop based on one or more event notifications from a sensitive information monitor, a launch of the particular application or the information item on the remote desktop before or after screen sharing is enabled.

6. The method of claim 1, wherein detecting that screen sharing is enabled comprises:

monitoring, by an event tracker of the remote desktop, a unified communications application that is running on the remote desktop; and detecting, by a controller of the remote desktop based on one or more event notifications from the event tracker, that screen sharing is enabled using the unified communications application.

7. A non-transitory computer-readable storage medium that includes a set of instructions which, in response to execution by a processor of a computer system, cause the processor to perform a method of sensitive information protection during screen sharing on a remote desktop, wherein the method comprises:

establishing a first connection between the remote desktop supported by the computer system and a client device operated by a first user to allow access to multiple applications supported by the remote desktop;

obtaining configuration information identifying sensitive information that requires protection during screen sharing, wherein the sensitive information includes at least a particular application from the multiple applications or an information item associated with the particular application;

based on the configuration information, monitoring the particular application or the information item; and in response to detecting that (a) screen sharing is enabled for the first user to share a visual representation associated with the remote desktop with a second user and (b) the particular application or the information item being monitored is active, establishing a second connection between the remote desktop and the client device that is separate from the first connection used to generate the visual representation associated with the remote desktop; and relaunching, using the second connection, the particular application or the information item in a user interface (UI) element that is excluded from the visual representation shared with the second user.

8. The non-transitory computer-readable storage medium of claim 7, wherein the method further comprises:

closing the particular application or the information item that is active on the remote desktop.

9. The non-transitory computer-readable storage medium of claim 7, wherein a seamless window server of the remote desktop interacts with a seamless window client of the client device to relaunch the particular application or the information item on the UI element, wherein the UI element includes a seamless window.

10. The non-transitory computer-readable storage medium of claim 9, wherein detecting that screen sharing is enabled comprises:

in response to a determination that screen sharing has ended, closing the seamless window and relaunching the particular application or the information item on the remote desktop.

11. The non-transitory computer-readable storage medium of claim 7, wherein monitoring the particular application or the information item comprises:

detecting, by a sensitive information controller of the remote desktop based on one or more event notifications from a sensitive information monitor, a launch of particular application or the information item on the remote desktop before or after screen sharing is enabled.

12. The non-transitory computer-readable storage medium of claim 7, wherein detecting that screen sharing is enabled comprises:

monitoring, by an event tracker of the remote desktop, a unified communications application that is running on the remote desktop; and detecting, by a sensitive information controller of the remote desktop based on one or more event notifications from the event tracker, that screen sharing is enabled using the unified communications application.

13. A computer system, comprising:

a processor; and a non-transitory computer-readable medium having stored thereon instructions that, when executed by the processor, cause the processor to perform the following:

establish a first connection between a remote desktop supported by the computer system and a client device operated by a first user to allow access to multiple applications supported by the remote desktop;

obtain, from the client device via the connection, configuration information identifying sensitive information that requires protection during screen sharing, wherein the sensitive information includes at least a particular application from the multiple applications or an information item associated with the particular application;

based on the configuration information, monitor the particular application or the information item; and in response to detecting that (a) screen sharing is enabled for the first user to share a visual representation associated with the remote desktop with a second user and (b) the particular application or the information item being monitored is active, establish a second connection between the remote desktop and the client device that is separate from the first connection used to generate the visual representation associated with the remote desktop; and relaunch, using the second connection, the particular application or the information item in a user interface (UI) element that is excluded from the visual representation shared with the second user.

14. The computer system of claim 13, wherein the non-transitory computer readable storage medium further includes instructions that cause the processor to:

close the particular application or the information item that is active on the remote desktop.

15. The computer system of claim 13, wherein a seamless window server of the remote desktop interacts with a seamless window client of the client device to relaunch the particular application or the information item on the UI element, wherein the UI element includes a seamless window.

16. The computer system of claim 15, wherein the instructions for detecting that screen sharing is enabled cause the processor to:

in response to a determination that screen sharing has ended, close the seamless window and relaunch the particular application or the information item on the remote desktop.

17. The computer system of claim 13, wherein the instructions for monitoring the particular application or the information item cause the processor to:

detect, by a sensitive information controller of the remote desktop based on one or more event notifications from a sensitive information monitor, a launch of the particular application or the information item on the remote desktop before or after screen sharing is enabled.

* * * * *